United States Patent
Lee et al.

(10) Patent No.: US 10,049,420 B1
(45) Date of Patent: Aug. 14, 2018

(54) DIGITAL ASSISTANT RESPONSE TAILORED BASED ON PAN DEVICES PRESENT

(71) Applicant: MOTOROLA SOLUTIONS, INC, Chicago, IL (US)

(72) Inventors: Geng Xiang Lee, Bayan Lepas (MY); Kok Khian Ng, Butterworth (MY); Luiloon Stephen Kuan, Teluk Kumbar (MY); Raamkumar Krishnan, Semenyih (MY); Kong Chin Chee, Bayan Baru (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/652,289

(22) Filed: Jul. 18, 2017

(51) Int. Cl.
| | |
|---|---|
| *H04M 11/04* | (2006.01) |
| *G06Q 50/26* | (2012.01) |
| *H04W 4/22* | (2009.01) |
| *H04L 12/28* | (2006.01) |
| *G06F 17/27* | (2006.01) |
| *H04W 4/90* | (2018.01) |
| *H04W 88/02* | (2009.01) |
| *H04W 84/18* | (2009.01) |
| *G06F 17/30* | (2006.01) |

(52) U.S. Cl.
CPC ....... *G06Q 50/265* (2013.01); *G06F 17/2705* (2013.01); *G06F 17/2785* (2013.01); *H04L 12/28* (2013.01); *H04W 4/22* (2013.01); *H04W 4/90* (2018.02); *G06F 17/30976* (2013.01); *H04W 84/18* (2013.01); *H04W 88/02* (2013.01)

(58) Field of Classification Search
CPC ......... H04L 29/06; H04L 12/28; H04L 12/56; H04L 12/66; H04L 12/2805; H04L 12/2809; H04L 12/2812; H04W 4/18; H04W 4/60; H04W 4/02; H04W 4/50; H04W 4/003; H04W 4/001; H04W 4/005; H04W 4/90; G10L 25/48; G10L 15/1822; G10L 2015/088; G10L 15/22; G06F 3/167; G06F 17/2785; H04M 1/72519; F06F 3/167; H04N 21/4126; G06Q 50/265
USPC ...... 455/404.1, 456.4, 410, 411, 461, 412.1; 710/220; 340/995.12
See application file for complete search history.

(56) References Cited

U.S. PATENT DOCUMENTS

| | | | | |
|---|---|---|---|---|
| 8,510,737 | B2 * | 8/2013 | Kunjithapatham | ... G06F 9/4843 340/12.22 |
| 8,538,757 | B2 * | 9/2013 | Patch | ..... G10L 15/193 704/251 |
| 8,995,972 | B1 * | 3/2015 | Cronin | ..... H04W 4/18 455/414.3 |
| 2003/0101151 | A1 * | 5/2003 | Holland | ..... G06N 3/004 706/45 |
| 2005/0228657 | A1 * | 10/2005 | Chou | ..... G10L 15/19 704/225 |

(Continued)

FOREIGN PATENT DOCUMENTS

JP   WO 2006093008 A1 *   9/2006   ........... H04W 48/16

*Primary Examiner* — Mahendra Patel

(57) ABSTRACT

A method and apparatus for providing a response/suggestion to a user by a digital assistant is provided herein. During operation the digital assistant will have access to devices connected to it via a personal-area network (PAN). The digital assistant will then tailor any response/suggestion to the user based on PAN devices associated with the network.

9 Claims, 5 Drawing Sheets

(56) References Cited

U.S. PATENT DOCUMENTS

| | | | | |
|---|---|---|---|---|
| 2005/0232242 A1* | 10/2005 | Karaoguz | ........... | H04L 12/2805 |
| | | | | 370/352 |
| 2006/0149905 A1* | 7/2006 | Park | ........................ | H04L 67/12 |
| | | | | 711/141 |
| 2011/0301943 A1* | 12/2011 | Patch | .................... | G10L 15/265 |
| | | | | 704/9 |
| 2012/0265528 A1* | 10/2012 | Gruber | .................... | G10L 15/18 |
| | | | | 704/235 |
| 2013/0185336 A1* | 7/2013 | Singh | ................ | G06F 17/30654 |
| | | | | 707/794 |
| 2015/0140526 A1* | 5/2015 | Marino | .............. | G06Q 10/1053 |
| | | | | 434/219 |

\* cited by examiner

US 10,049,420 B1

DIGITAL ASSISTANT RESPONSE TAILORED BASED ON PAN DEVICES PRESENT

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

Since a digital assistant does not know the equipment a public-safety officer has on hand, a problem exists in that the digital assistant may not provide the best response/instructions to the user. For example, consider a police officer responding to an active shooter event. A police officer using a digital assistant (sometimes referred to as a virtual partner) during the event will have the same instructions given to them whether or not they have access to a bullet-proof vest, a long gun, . . . , etc. Instructions to someone wearing a bullet-proof vest may be very different to instructions given to someone not wearing a bullet-proof vest. Similarly, instructions given to someone with access to a long gun may be very different to instructions given to someone without access to a long gun.

Considering the above, it would be very beneficial if a digital assistant could tailor their output based on equipment on hand. In doing so, the digital assistant will need to have a mechanism for determining the equipment on hand.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for providing a response/suggestion to a user by a digital assistant is provided herein. During operation the digital assistant will have knowledge of devices connected to form a personal-area network (PAN). The digital assistant will then tailor any response/suggestion to the user based on the associated PAN devices.

Figure 1:
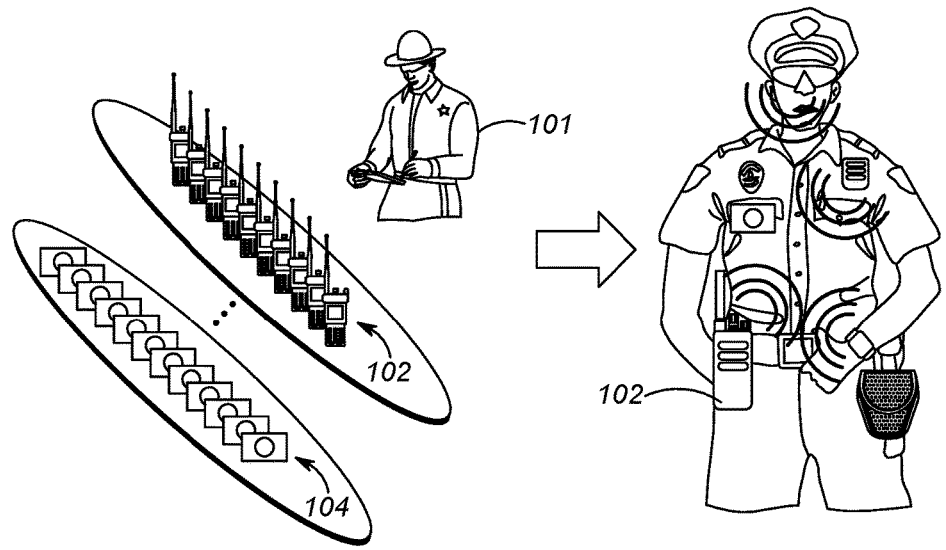
FIG. 1 illustrates an operational environment for the present invention.

Turning now to the drawings, wherein like numerals designate like components, FIG. 1 illustrates an operational environment for the present invention. As shown, a public safety officer 101 will be equipped with devices that determine various physical and environmental conditions surrounding the public-safety officer. These conditions are generally reported back to a dispatch center so an appropriate action may be taken. For example, future police officers may have a sensor that determines when a gun is drawn. Upon detecting that an officer has drawn their gun, a notification may be sent back to the dispatch operator so that, for example, other officers in the area may be notified of the situation.

It is envisioned that the public-safety officer will have an array of shelved devices available to the officer at the beginning of a shift. The officer will select the devices off the shelf, and form a personal area network (PAN) with the devices that will accompany the officer on his shift. For example, the officer may pull a gun-draw sensor, a body-worn camera, a wireless microphone, a smart watch, a police radio, smart handcuffs, a man-down sensor, . . . , etc. All devices pulled by the officer will be configured to form a PAN by associating (pairing) with each other and communicating wirelessly among the devices. At least one device may be configured with a digital assistant. In a preferred embodiment, the PAN comprises more than two devices, so that many devices are connected via the PAN simultaneously.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown in FIG. 1, public-safety officer 101 has an array of devices to use during the officer's shift. For example, the officer may pull one radio 102 and one camera 104 for use during their shift. Other devices may be pulled as well. As shown in FIG. 1, officer 101 will preferably wear the devices during a shift by attaching the devices to clothing. These devices will form a PAN throughout the officer's shift.

Figure 2:
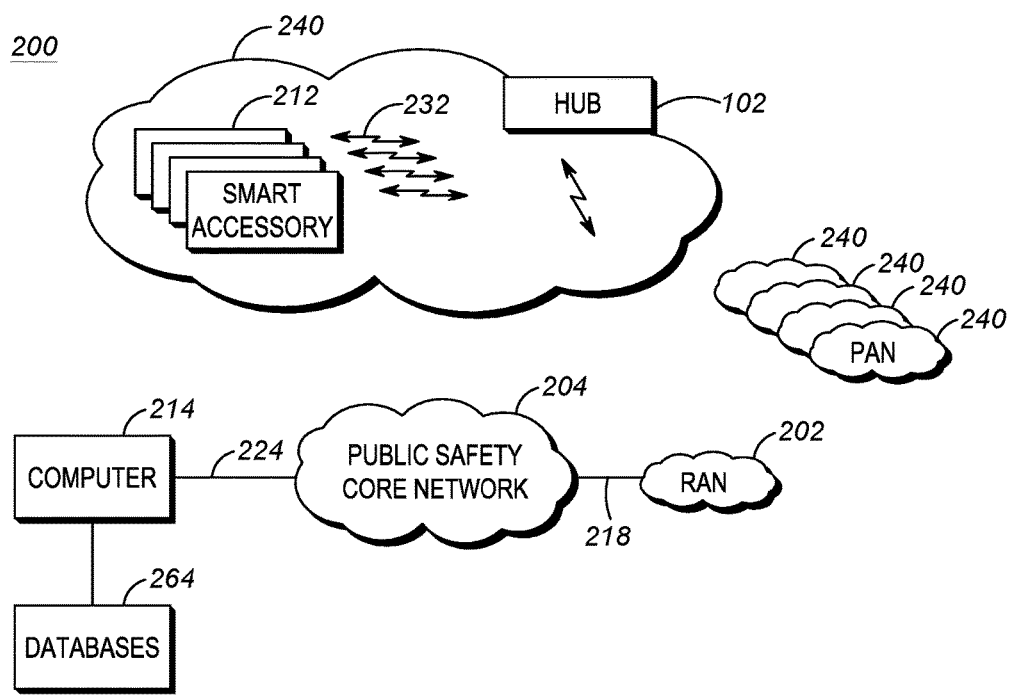
FIG. 2 depicts an example communication system that incorporates a personal-area network and a digital assistant.

FIG. 2 depicts an example communication system 200 that incorporates PANs created as described above. System 200 includes one or more radio access networks (RANs) 202, a public-safety core network 204, hub (PAN master device) 102, local devices (slave devices that serve as smart accessories/sensors) 212, computer 214, and communication links 218, 224, and 232. In a preferred embodiment of the present invention, hub 102 and devices 212 form PAN 240, with communication links 232 between devices 212 and hub 102 taking place utilizing a short-range communication system protocol such as a Bluetooth communication system protocol. Each officer will have an associated PAN 240. Thus, FIG. 2 illustrates multiple PANs 240 associated with multiple officers.

RAN 202 includes typical RAN elements such as base stations, base station controllers (BSCs), routers, switches, and the like, arranged, connected, and programmed to provide wireless service to user equipment (e.g., hub 102, and the like) in a manner known to those of skill in the relevant art. RAN 202 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 202 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 202 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 204 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 204 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Hub 102 serves as a PAN master device, and may be any suitable computing and communication device configured to engage in wireless communication with the RAN 202 over the air interface as is known to those in the relevant art. Moreover, one or more hub 102 are further configured to engage in wired and/or wireless communication with one or more local device 212 via the communication link 232. Hub 102 will be configured to determine when to forward information received from PAN devices to, for example, a dispatch center. The information can be forwarded to the dispatch center via RANs 202 based on a combination of device 212 inputs. In one embodiment, all information received from sensors 212 will be forwarded to computer 214 via RAN 202. In another embodiment, hub 102 will filter the information sent, and only send high-priority information back to computer 214.

It should also be noted that any one or more of the communication links 218, 224, could include one or more wireless-communication links and/or one or more wired-communication links.

Devices 212 and hub 102 may comprise any device capable of forming a PAN. For example, devices 212 may comprise a gun-draw sensor, a body temperature sensor, an accelerometer, a heart-rate sensor, a breathing-rate sensor, a camera, a GPS receiver capable of determining a location of the user device, smart handcuffs, a clock, calendar, environmental sensors (e.g. a thermometer capable of determining an ambient temperature, humidity, presence of dispersed chemicals, radiation detector, etc.), an accelerometer, a biometric sensor (e.g., wristband), a barometer, speech recognition circuitry, a gunshot detector, . . . , etc. Some examples follow:

A sensor-enabled holster 212 may be provided that maintains and/or provides state information regarding a weapon or other item normally disposed within the user's sensor-enabled holster 212. The sensor-enabled holster 212 may detect a change in state (presence to absence) and/or an action (removal) relative to the weapon normally disposed within the sensor-enabled holster 212. The detected change in state and/or action may be reported to the portable radio 102 via its short-range transceiver. In some embodiments, the sensor-enabled holster may also detect whether the first responder's hand is resting on the weapon even if it has not yet been removed from the holster and provide such information to portable radio 102. Other possibilities exist as well.

A biometric sensor 212 (e.g., a biometric wristband) may be provided for tracking an activity of the user or a health status of the user 101, and may include one or more movement sensors (such as an accelerometer, magnetometer, and/or gyroscope) that may periodically or intermittently provide to the portable radio 102 indications of orientation, direction, steps, acceleration, and/or speed, and indications of health such as one or more of a captured heart rate, a captured breathing rate, and a captured body temperature of the user 101, perhaps accompanying other information.

An accelerometer 212 may be provided to measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

A heart rate sensor 212 may be provided and use electrical contacts with the skin to monitor an electrocardiography (EKG) signal of its wearer, or may use infrared light and imaging device to optically detect a pulse rate of its wearer, among other possibilities.

A breathing rate sensor 212 may be provided to monitor breathing rate. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor 212 may be provided, and includes an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities. Temperature sensor 212 may be used on equipment to determine if the equipment is being worn or not. For example, temperature sensor 212 may exist interior to a bullet-proof vest. I the temperature sensor 212 senses a temperature above a predetermined threshold (e.g., 80 degrees), it may be assumed that the vest is being worn by an officer.

Computer 214 comprises, or is part of a computer-aided-dispatch center, manned by an operator providing necessary dispatch operations. For example, computer 214 typically comprises a graphical user interface that provides the dispatch operator necessary information about public-safety officers. As discussed above, much of this information originates from devices 212 providing information to hub 102, which forwards the information to RAN 202 and ultimately to computer 214. Computer 214 comprises a virtual partner (e.g., a microprocessor serving as a virtual partner/digital assistant) that is configured to receive sensor data from sensors 212 and keep track of relevant information. For example, each user of the system may possess a hub with many associated devices forming a PAN. For each user of the system, computer 214 may track the user's current associated PAN devices (sensors 212) along with sensor data for that user. This information may be used to compile a summary for each user (e.g., equipment on hand for each user, along with state information for the equipment). The information is preferably stored in database 264.

With the above in mind, computer 214 is also configured with a natural language processing (NLP) engine configured to determine the intent and/or content of the any over-the-air voice transmissions received by users. The NLP engine may also analyze oral queries and/or statements received by any user and provide responses to the oral queries and/or take other actions in response to the oral statements. It should be noted that any communication between users on the talk-group will be monitored by the NLP engine in order to determine the content of the over-the-air voice transmission.

Figure 3:
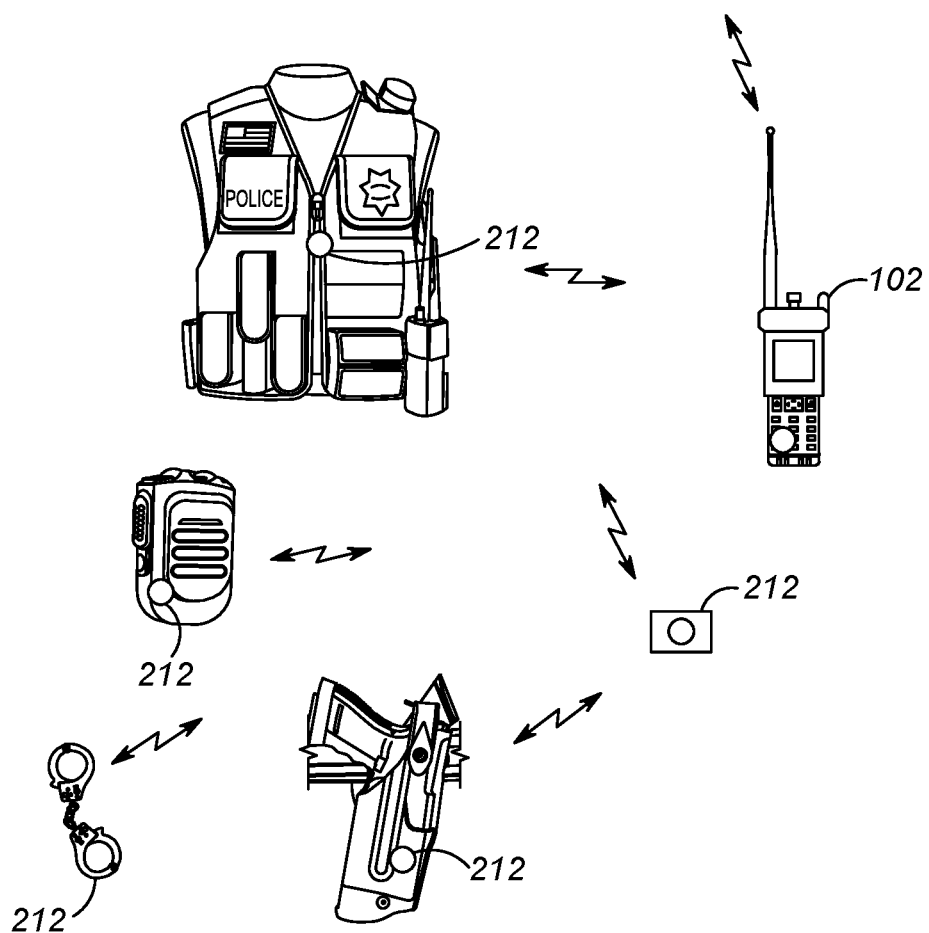
FIG. 3 is a more-detailed view of a personal-area network of FIG. 2.

FIG. 3 depicts another view of a personal-area network 240 of FIG. 2. Personal-area network comprises a very local-area network that has a range of, for example 10 feet. As shown in FIG. 3, various devices 212 are that attach to clothing utilized by a public-safety officer. In this particular example, a bio-sensor is located within a police vest, a voice detector is located within a police microphone, smart handcuffs 212 are usually located within a handcuff pouch (not shown), a gun-draw sensor is located within a holster, and a camera 212 is provided.

Devices 212 and hub 102 form a PAN 240. PAN 240 preferably comprises a Bluetooth PAN. Devices 212 and hub 102 are considered Bluetooth devices in that they operate using a Bluetooth, a short range wireless communications technology at the 2.4 GHz band, commercially available from the "Bluetooth special interest group". Devices 212 and hub 102 are connected via Bluetooth technology in an ad hoc fashion forming a PAN. Hub 102 serves as a master device while devices 212 serve as slave devices.

Hub 102 provides information to the officer, and/or forwards local status alert messages describing each sensor state/trigger event over a wide-area network (e.g., RAN/Core Network) to computer 214. In alternate embodiments of the present invention, hub 102 may forward the local status alerts/updates for each sensor to mobile and non-mobile peers (shift supervisor, peers in the field, etc), or to the public via social media. RAN core network preferably comprises a network that utilizes a public-safety over-the-air protocol. Thus, hub 102 receives sensor information via a first network (e.g., Bluetooth PAN network), and forwards the information to computer 214 via a second network (e.g., a public safety wide area network (WAN)). When the virtual partner is located within computer 214, any request to the virtual partner will be made via the second network. In addition, any communication from the virtual partner to computer 214 will take place using the second network.

As described above, since prior-art digital assistants do not know the equipment a public-safety officer has on hand, a problem exists in that the digital assistant may not provide the best response/instructions to the user. In order to determine equipment on hand, a digital assistant will determine PAN members for each hub 102 associated with a user. For example, if Officer Smith is provided with a hub, and a plurality of associated devices/sensors 212, any digital assistant may be provided with this information and deduce devices present with Officer Smith. The digital assistant may then tailor responses based on devices that are present. Responses may also be tailored based on a state of present devices. For example, consider the situation where a paramedic is taking care of a potential heart-attack victim. The virtual partner may recognize that the defibrillator is low on power after a previous unrelated incident, and suggest an alternative means for treatment (e.g., chest compressions).

Figure 4:
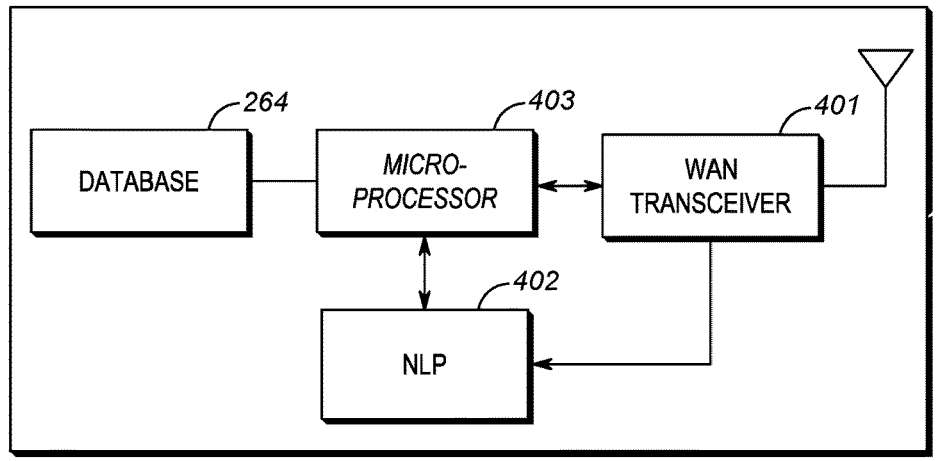
FIG. 4 is a block diagram of a dispatch center.

With the above in mind, FIG. 4 sets forth a schematic diagram that illustrates a device 400 for a digital assistant to determine what devices/equipment is present and tailor a response accordingly. In an embodiment, the device is embodied within computer 214 (dispatch center 214), however in alternate embodiments the device may be embodied within the public-safety core network 204, or more computing devices in a cloud compute cluster (not shown), or some other communication device not illustrated in FIG. 2, and/or may be a distributed communication device across two or more entities.

FIG. 4 shows those components (not all necessary) for device 400 to determine what equipment is present, potentially determine a status of each equipment present, and to tailor a response accordingly. For ease of illustration some components have been left out of FIG. 4. For example, a graphical user interface that provides the dispatch operator necessary information about public-safety officers is not shown since that component is not necessary for understanding the following discussion.

As shown, device 400 may include a wide-area-network (WAN) transceiver 401 (e.g., a transceiver that utilizes a public-safety communication-system protocol), Natural Language Processor (NLP) 402, logic circuitry 403 (which may serve as a digital assistant). In other implementations, device 400 may include more, fewer, or different components. Regardless, all components are connected via common data busses as known in the art.

WAN transceiver 401 may comprise well known long-range transceivers that utilize any number of network system protocols. (As one of ordinary skill in the art will recognize, a transceiver comprises both a transmitter and a receiver for transmitting and receiving data). For example, WAN transceiver 401 may be configured to utilize a next-generation cellular communications protocol operated by a cellular service provider, or any public-safety protocol such as an APCO 25 network or the FirstNet broadband network. WAN transceiver 401 receives communications from al members of all talkgroups, as well as sensor data from all users. It should be noted that WAN transceiver 401 is shown as part of device 400, however, WAN transceiver 401 may be located in RAN 202 (e.g., a base station of RAN 202), with a direct link to device 400.

NLP 402 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 403 comprises a digital signal processor (DSP), general purpose microprocessor, a programmable logic device, or application specific integrated circuit (ASIC) and is configured (along with NLP 402) to serve as a digital assistant/virtual partner a users of the system. For example, logic circuitry may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers (i.e., the joining of a talkgroup, a sensor status, . . . , etc.) in which the electronic digital assistant may proactively provide such valuable information to the user absent any explicit request from the user.

With the above in mind, and as an example, device 4000 may be continuously compiling a history of user's associated PAN sensors. Hub 102 may send a query to device 400 (e.g., to computer 214 when device 400 is embodied within computer 214). Such a query may be something as simple as "advice please", or may be more specific, such as, "Please give me advice on how to handle this victim". Alternatively, no query may be sent, and device 400 may simply provide information unsolicited. Device 400 may send a response to hub 102. As discussed above, the response may be based on PAN devices present along with the state of such PAN devices.

Database 264 is provided. Database 264 comprises standard memory (such as RAM, ROM, . . . , etc) and serves to store user identifications along with associated hubs 102 and their PAN devices 212. The state of each PAN device may be stored as well. As an example, PAN state information may comprise a battery level, ammunition level, RF signal strength, inventory of emergency aid such as adrenaline shots, gauze, . . . , etc. Additionally, database 264 may also contain utterances (words, statements, or vocal sounds) that may be used based on the PAN devices present.

Figure 5:
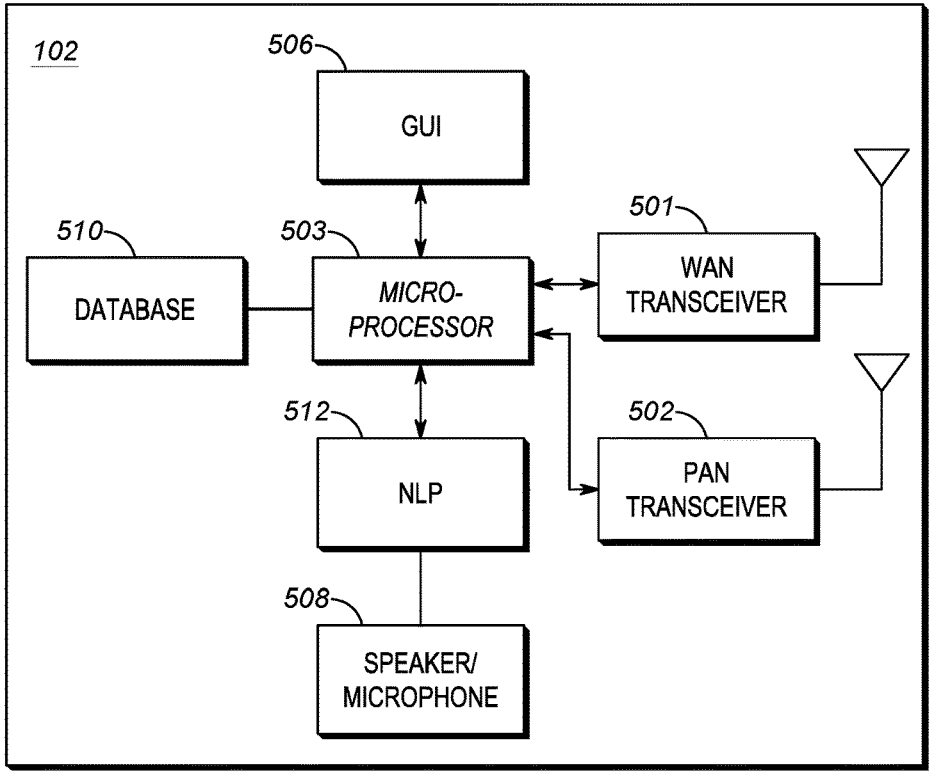
FIG. 5 is a block diagram of a hub.

It should be noted that the above description had the digital assistant functionality encompassed within dispatch center 214. In an alternate embodiment this functionality may be encompassed within hub 102. This is shown in FIG. 5. As shown, hub 102 includes a wide-area-network (WAN)

transceiver 501 (e.g., a transceiver that utilizes a public-safety communication-system protocol), PAN transceiver 502 (e.g., a short-range transceiver), Graphical User Interface (GUI) 506, database 510, logic circuitry 503, speaker 508 and NLP 512. In other implementations, hub 102 may include more, fewer, or different components. For example, if digital-assistant functionality is being provided by dispatch center 214, then database 510 and NLP 512 may be absent from hub 102.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network.

PAN transceiver 502 may be well known short-range (e.g., 30 feet of range) transceivers that utilize any number of network system protocols. For example, PAN transceiver 502 may be configured to utilize Bluetooth communication system protocol for a body-area network, or a private 802.11 network.

GUI 506 comprises provides a way of displaying information and receiving an input from a user. For example, GUI 506 may provide a way of conveying (e.g., displaying) information to a user regarding that status of devices 212.

Speaker/microphone 408 provides a mechanism for receiving human voice and providing it to the virtual partner (e.g., logic circuitry 503/NLP 512), along with providing audible information generated by the digital assistant (e.g., a voice).

Logic circuitry 403 comprises a digital signal processor (DSP), general purpose microprocessor, a programmable logic device, or application specific integrated circuit (ASIC) and is configured along with NLP 512 to provide digital assistant functionality.

Database 110 is provided. Database 410 comprises standard memory (such as RAM, ROM, . . . , etc) and serves to store PAN member names (identifications) and their statuses. So, for example, database 410 may comprise a list of PAN members (long gun, bullet-proof vest, gun-draw sensor, . . . , etc.) that formed a PAN with hub 102. Database 410 also store status information for each sensor (e.g., long gun in use, bullet-proof vest being worn, dun-draw sensor indicating a gun is holstered, . . . , etc.). Database 110 may also comprise utterances that will be used by any digital assistant (e.g., processor 503/NLP 512).

NLP 12 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Regardless of whether or not digital-assistant functionality is located within dispatch center 214, or whether digital-assistant functionality is located within hub 102, the digital assistant will tailor responses to any query, or will tailor alerts provided by the digital assistant based on PAN devices connected to hub 102 via the PAN connection. As discussed, any virtual assistant communication may also be tailored based on the status of sensors attached to hub 102. Some examples follow:

A Heart attack victim is first attended to by paramedic that has a defibrillator and a Heart or blood pressure monitor as part of their PAN. A virtual partner is invoked by the paramedic. The virtual partner will recognize the presence of heart rate monitor and blood pressure monitor with the paramedic, and the absence of a stethoscope. This is accomplished by accessing an internal memory to determine devices forming a PAN with a hub device belonging to the paramedic.

The virtual partner will map those devices within the memory forming the PAN to potential responses and advise the paramedic to attach and use the reading from above devices to confirm or rule out the cardiac arrest. The virtual partner will not give instructions for using a stethoscope to check for breathing or pulse but will suggest alternative methods. Upon successful diagnosis of cardiac arrest, the virtual partner will then suggest procedures to resuscitate the patient. Because the VP is aware of the status of the defibrillator being low on power, alternatives like chest compressions are suggested instead.

With the above in mind, when the circuitry of FIG. 4 is embodied within dispatch center 214, the dispatch center will comprise a wide-area network (WAN) transceiver 401 receiving identifications of devices that form a personal-area network (PAN). A database 264 is provided for storing identifications of the devices that form the PAN. Logic circuitry 403 maps the stored identifications of the devices that form the PAN to potential digital assistant utterances (possibly located within database 264 or stored elsewhere and accessed through intervening networks) and formulates wording (e.g., sentences as part of a natural-language communication) based on the mapping. WAN transceiver 401 will then transmit the digital assistance wording over the WAN.

As discussed a natural-language processor 402 may be provided for receiving a query, and the wording (e.g., sentences) is also formulated based on the query. For example, a query that asks, "tell me how to help this patient?" may provide different wordings than a query that asks "should this patient be hospitalized?".

Additionally, the wording can also be formulated based on a public-safety incident identification. As one of ordinary skill in the art will recognize an incident identification (sometimes referred to as an incident scene identifier, or a CAD incident identifier) is generated for incidents where an officer is dispatched. This ID could be something as simple as a number, or something as complicated as an identification that is a function of populated fields, one of which may comprise an incident type. The CAD ID may be generated by the dispatch operator, or automatically in response to, for example, an alarm being triggered (e.g., a fire alarm, a bank robbery alarm, . . . , etc.). The CAD ID may also be used for formulating wording. For example, if a CAD ID indicates a bank robbery is taking place, the answer to a query, "what is going on?", will be different than if a bank robber is not taking place.

With the above in mind, logic circuitry 403 will have PAN member identifications as inputs (available from database 264). Logic circuitry 403 may also have an incident type (e.g., CAD ID) as an input (available from, for example, the dispatch operator GUI (not shown in FIG. 4)). Logic circuitry 403 may also have a user query as an input (input from NLP 402). Processor 403 will also have available a set of utterances that may be used when formulating a response. As discussed, these utterances may be available from database 264, or may be obtained via a cloud computing network. Logic circuitry 403 will map the PAN members to possible utterances to obtain wording to be provided to the user. Logic circuitry 403 may use the CAD ID and the query in the mapping process so that the wording is based on PAN members, CAD ID, and the query.

The mapping process preferably comprises an operation that associates each element of a given set (the domain) with one or more elements of a second set (the range). The PAN members and potentially the CAD ID and query comprises the domain, while the utterances comprise the range. The mapping may be explicit based on predefined rules, or the mapping may be trained via neural network modeling. The mapping produces the wording. The wording preferably (but not necessarily) comprises sentences as part of a natural-language communication with a user.

With the above in mind, when the circuitry of FIG. 5 is embodied within hub 102, hub 102 will comprise a personal-area network (PAN) transceiver 502 forming a PAN with a plurality of sensors 212. A wide-area network (WAN) transceiver is provided for transmitting sensor information from the plurality of sensors to a dispatch center 214. A database 510 is provided comprising identifications of the sensors that form the PAN, and logic circuitry 503 maps the stored identifications of the sensors that form the PAN to potential digital assistant utterances and formulating wording based on the mapping. Graphical user interface (GUI) 506 or speaker 508 outputs the wording.

As discussed a natural-language processor 512 may be provided for receiving a query, and the wording is also formulated based on the query as discussed above. Additionally, the wording can also be formulated based on a public-safety incident identification.

With the above in mind, logic circuitry 503 will have PAN member identifications as inputs (available from database 510). Logic circuitry 503 may also have an incident type (e.g., CAD ID) as an input (received via WAN 501 from dispatch center 214). Logic circuitry 503 may also have a user query as an input (input from NLP 512). Processor 503 will also have available a set of utterances that may be used when formulating a response. As discussed, these utterances may be available from database 510, or may be obtained via a cloud computing network. Logic circuitry 503 will map the PAN members to possible utterances to obtain wording to be provided to the user. Logic circuitry 503 may use the CAD ID and the query in the mapping process so that the wording is based on PAN members, CAD ID, and the query.

The mapping process preferably comprises an operation that associates each element of a given set (the domain) with one or more elements of a second set (the range). The PAN members and potentially the CAD ID and query comprises the domain, while the utterances comprise the range. The mapping may be explicit based on predefined rules, or the mapping may be trained via neural network modeling.

Figure 6:
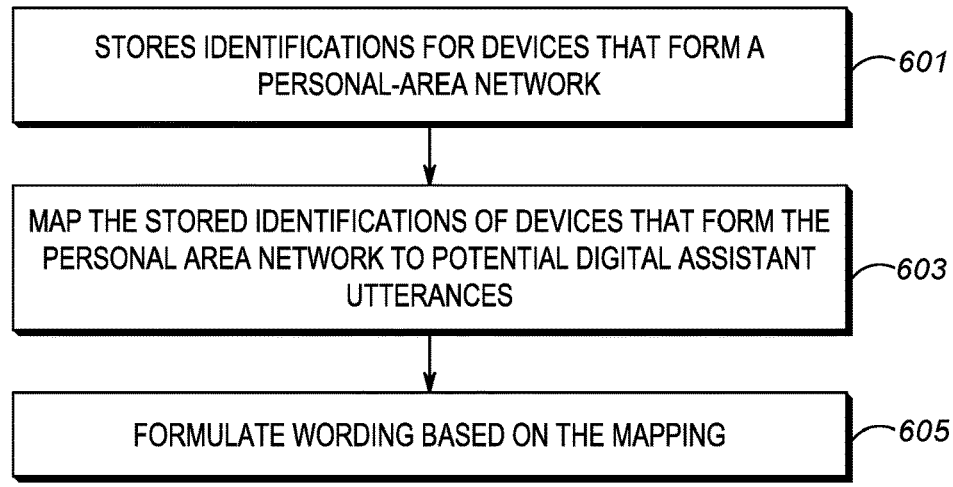
FIG. 6 is a flow chart showing operation of the hub of FIG. 5 when digital assistant functionality exists within the hub.

FIG. 6 is a flow chart showing operation of the devices of FIG. 4 and FIG. 5. The logic flow begins at step 601 where processor 403/503 stores identifications for devices that form a personal-area network (PAN). When a digital assistant provides wording to a user, the digital assistant (e.g., processors 403/503) will map the stored identifications of devices that form the personal area network to potential digital assistant utterances (step 603), and formulate wording (e.g., a response to a question) based on the mapping (step 605).

Figure 7:
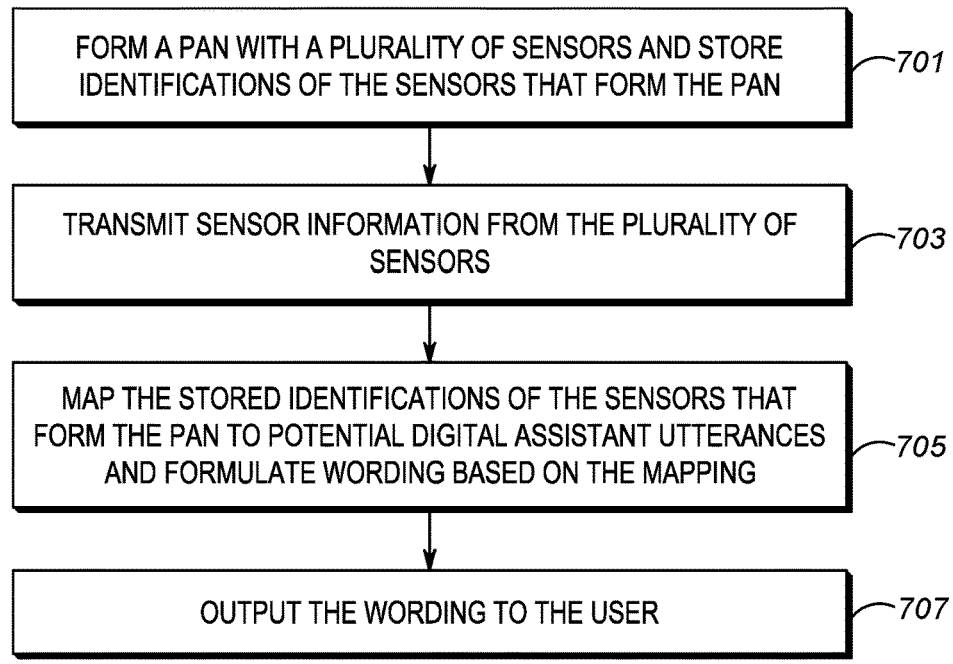
FIG. 7 is a flow chart showing operation of the hub of FIG. 5 when digital assistant functionality exists within the dispatch center.

FIG. 7 is a more-detailed flow chart (not all steps are necessary) for operating hub 102. The logic flow begins at step 701 where a personal-area network (PAN) transceiver 502 forms a PAN with a plurality of sensors 212 and stores identifications of the sensors that form the PAN. While the PAN is formed, WAN transceiver 501 transmits sensor information from the plurality of sensors 212 to a dispatch center 214 (step 703). When wording is to be provided to a user, for example, as part of a digital assistant communication, logic circuitry 503 maps the stored identifications of the sensors that form the PAN to potential digital assistant utterances and formulates wording (e.g., sentences as part of a natural-language communication) based on the mapping (step 705). GUI 506 or speaker 508 can be used for outputting the wording to the user (step 707). In the case where GUI 506 is utilized, the wording may be output as text displayed on a screen. In the case where speaker 508 is utilized, the wording can be output in an audible manner.

Figure 8:
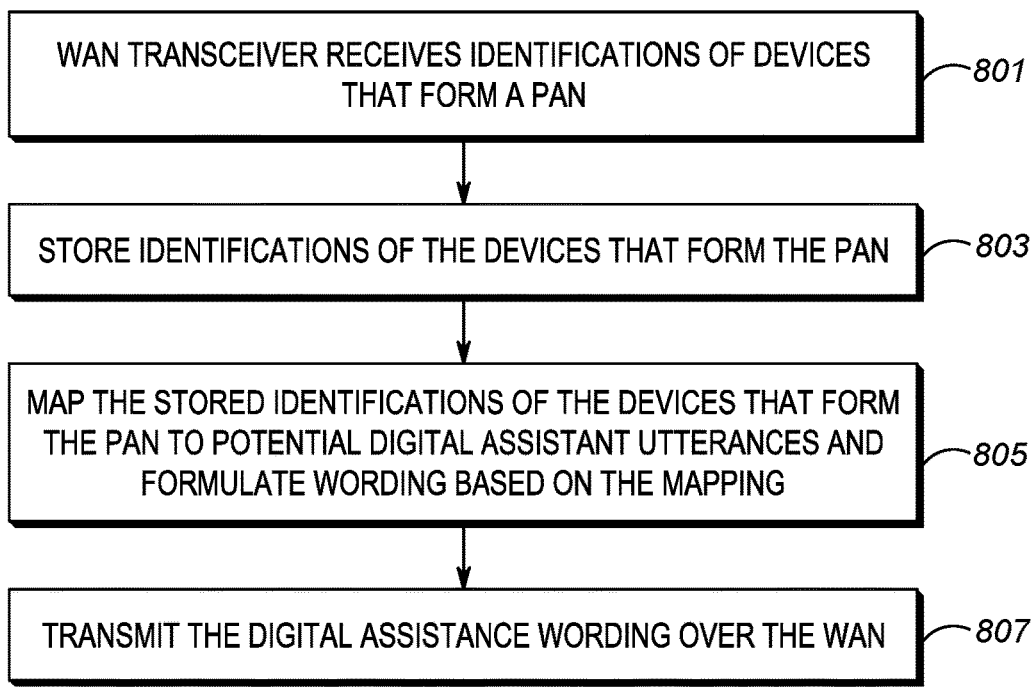
FIG. 8 is a flow chart showing operation of the dispatch center when digital assistant functionality exists within the dispatch center.

FIG. 8 is a flow chart showing operation of device 400. As discussed above, device 400 may comprise a dispatch center 214. The logic flow begins at step 801 where a wide-area network (WAN) transceiver receives identifications of devices that form a personal-area network (PAN). As discussed above, the identifications may be received over the air from various hubs 102. At step 803 database 264 is utilized for storing identifications of the devices that form the PAN. When a digital assistant needs to provide wording to a user, logic circuitry 403 maps the stored identifications of the devices that form the PAN to potential digital assistant utterances and formulating wording based on the mapping (step 805). The WAN transceiver 401 then transmits the digital assistance wording over the WAN (step 807).

In FIGS. 6, 7, and 8, a natural-language processor pay be provided for receiving a query, and wherein the wording is also formulated based on the query. In a similar manner the wording can also be formulated based on a public-safety incident identification. With this in mind, the natural-language processor may receive a query and the step of formulating wording is also based on the received query.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    a wide-area network (WAN) transceiver receiving identifications of devices that form a personal-area network (PAN);
    a database storing identifications of the devices that form the PAN;
    logic circuitry mapping the stored identifications of the devices that form the PAN to potential digital assistant utterances and formulating wording based on the mapping, wherein the mapping comprises an operation that associates each element of a given set (a domain) with one or more elements of a second set (a range), wherein the devices that form the PAN are part of the domain, while the utterances comprise the range; and
    wherein the WAN transceiver transmits the digital assistant wording over the WAN.

2. The apparatus of claim 1 further comprising:
    a natural-language processor receiving a query, and wherein the wording is also formulated based on the query.

3. The apparatus of claim 1 wherein the wording is also formulated based on a public-safety incident identification.

4. An apparatus comprising:
    a personal-area network (PAN) transceiver forming a PAN with a plurality of sensors;
    a wide-area network (WAN) transceiver transmitting sensor information from the plurality of sensors to a dispatch center;
    a database comprising identifications of the sensors that form the PAN;
    logic circuitry mapping the stored identifications of the sensors that form the PAN to potential digital assistant utterances and formulating wording based on the mapping, wherein the mapping comprises an operation that associates each element of a given set (a domain) with one or more elements of a second set (a range), wherein the devices that form the PAN are part of the domain, while the utterances comprise the range; and
    a graphical user interface (GUI) or speaker outputting the wording.

5. The apparatus of claim 4 further comprising:
    a natural-language processor receiving a query, and wherein the wording is also formulated based on the query.

6. The apparatus of claim 4 wherein the wording is also formulated based on a public-safety incident identification.

7. A method comprising the steps of:
    storing within a database, identifications of devices that form a personal-area network (PAN);
    mapping the stored identifications of devices that form the personal area network to potential digital assistant utterances, wherein the mapping comprises an operation that associates each element of a given set (a domain) with one or more elements of a second set (a range), wherein the devices that form the PAN are part of the domain, while the utterances comprise the range; and
    formulating wording based on the mapping.

8. The method of claim 7 further comprising the steps of:
receiving a query; and
wherein the step of formulating wording is also based on the received query.

9. The method of claim 7 further comprising the steps of:
receiving a public-safety incident identification; and
wherein the step of formulating wording is also based on the received public-safety incident identification.

\* \* \* \* \*